United States Patent [19]

Verkinderen et al.

[11] 4,269,647
[45] May 26, 1981

[54] METHOD FOR THE CONTINUOUS COATING OF WEBS HAVING SPLICED JOINTS

[75] Inventors: Paul A. Verkinderen, Edegem; Ludovicus H. Verhoeven, Zoersel; Lucien A. Christiaen, Wilrijk; Camille F. Pira, Edegem; Michel L. Marckx, Mortsel, all of Belgium

[73] Assignee: AGFA-GEVAERT N.V., Mortsel, Belgium

[21] Appl. No.: 949,434

[22] Filed: Oct. 10, 1978

[30] Foreign Application Priority Data

Oct. 12, 1977 [GB] United Kingdom ............... 42509/77

[51] Int. Cl.³ .................... B31F 5/00; B65H 19/00; B65H 69/02
[52] U.S. Cl. .................................. 156/157; 156/280; 156/301; 427/401; 427/424; 427/429
[58] Field of Search ............... 427/284, 285, 359, 414, 427/402, 424, 434 R, 355, 434.2, 401, 429; 156/157, 304, 280, 505, 506, 301.1; 428/57, 58

[56] References Cited

U.S. PATENT DOCUMENTS

| 2,319,353 | 5/1943 | Schwartz et al. | 427/424 |
|---|---|---|---|
| 3,518,141 | 6/1970 | Bourns et al. | 156/157 |
| 3,531,362 | 9/1970 | Bourns et al. | 156/157 |
| 3,655,473 | 4/1972 | O'Brien | 156/157 |
| 3,972,762 | 8/1976 | Kawahara et al. | 156/304 |
| 4,024,302 | 5/1977 | Takagi et al. | 156/157 |

FOREIGN PATENT DOCUMENTS

| 986259 | 3/1965 | United Kingdom | 156/505 |
|---|---|---|---|
| 1333083 | 10/1973 | United Kingdom | 156/505 |

Primary Examiner—Ronald H. Smith
Assistant Examiner—Sadie L. Childs
Attorney, Agent, or Firm—William J. Daniel

[57] ABSTRACT

Defects in the coating of webs with aqueous solutions of hydrophilic colloids traceable to the effects of web splices are reduced. The webs are butt-joined by a splicing tape applied to their back side and are provided with a hydrophobic coating over their front side at the splicing region. The invention is particularly advantageous in the manufacture of photographic material.

6 Claims, 3 Drawing Figures

METHOD FOR THE CONTINUOUS COATING OF WEBS HAVING SPLICED JOINTS

The present invention relates to a method for the continuous coating of a moving web with a layer of an aqueous solution of a hydrophilic colloid, wherein the disturbing effect of spliced joints in the web upon the coating process are reduced.

In many manufacturing operations a substantially continuous web is coated with a liquid material, such as aqueous solutions or dispersions of hydrophilic colloids, which may then be dried to form the desired product. Such manufacturing processes are used in the manufacture of adhesive tapes, magnetic recording tapes and photographic films and papers, among others. In order to increase the efficiency, and consequently lower the cost, of manufacturing these products, the coating process generally is carried out in a substantially continuous manner. Inasmuch as the web or support for the coating can only be obtained in finite lengths, a new supply roll of the web must be periodically spliced to the end of the preceding supply roll so that the coating process may continue uninterruptedly.

It has been found that the most desirable way of splicing such webs is to utilize a splice tape extending across the web width and joining the two adjacent ends of the web together. It has also been found in practice that the application of the splice tape to the front side of the web, that is the side receiving the coating provides fewer coating flaws than does the application of the splice tape to the back side of the web. However, even though the application of the splice tape to the front side of the web results in fewer coating problems than do other methods of splicing, streaks and other defects still occur in the coating downstream from the splice tape. Normally, the spliced section of the continuous web is cut from the finished product and is scrapped so that the defects in the coating occurring at the splice joint are not found in the final product. However, it has been found that under certain conditions, the splice joint may affect substantial lengths of the coated web downstream from the splice. This is notably the case when the coating of the web occurs in accordance with the so-called bead coating method wherein the web is passed in very close proximity to the lip of a slide hopper from which the coating solution flows downwardly as a layer of uniform thickness and establishes contact with the front side of the web through a puddle or pile of coating solution. In some products, it is possible to cut out the affected portion of the web without substantially affecting the usability of adjacent portions. However, in other products this is not possible, and the entire web containing such defects must be scrapped.

As the speed of coating webs is increased and as the width of the web products is also increased, the value of the product being scrapped due to splice-imparted defects downstream from the splice has become excessive. This is even more true in high-cost products utilizing an expensive coating material which cannot be easily recovered from scrapped portions of the web. As a result, it has become increasingly important to minimize, if not eliminate, defects resulting from the splice from the coated web products. Moreover, the elimination of these defects must be accomplished without materially increasing the cost of the product.

Furthermore, the elimination of the splice-imposed defects may in no way result into other, potentially more serious defects in the coated product. Additionally, the method of eliminating the splice-imposed defects must be readily accomplished without affecting production rates now possible in high speed coating apparatus.

Many of the defects in coated webs appear to result from the entrainment of air in the coating deposited in the web or from the adherence of a small bubble of air to the coating nozzle, which then affects further portions of the coating deposited on the web. It has been found that such entrained air is picked up and such bubbles are generated as the coating drops down over the splice tape onto the surface of the web. The air being entrained appears to come from that entrapped in the angle formed between the edge of the splice tape and the surface of the web.

It has been proposed to eliminate disturbances in the layer of the coating composition downstream of a spliced joint in the web by coating the downstream part of the splicing tape and the adjacent leading end portion of the new web, with a hydrophobic oil prior to applying the layer of coating solution.

It has further been proposed to form a bevelled transition from the downstream edge of the splicing tape surface to the web surface. This may be accomplished by feathering the downstream edge of the splicing tape, or by filling the transition from the tape surface to the web surface with an oily-hydrophobic material or with a rubber cement.

It will be understood that the technique of forming a bevelled transition is much more complicated in practice than the technique of applying a coating with a hydrophobic oil on the tape and on the adjacent downstream web surface, and therefore the latter approach appears most attractive in practice.

It has now been found, that by butt-joining the web ends to each other by means of a splicing tape applied to the back side of the abutting webs and by providing the butt-joint area at the front side of the webs with a hydrophobic coating prior to applying the layer of aqueous solution, results are obtained that are superior to those that are obtainable with a tape splice at the front side of the webs.

This improvement is most surprising, since the prior art experience in the splicing of webs teaches that application of a splice tape to the front side of the webs, results into fewer coating defects than does the application of the tape to the back side of the webs.

The term "front side" of the webs here and in the further description means the side of the web that is considered for being coated, whereas the term "back side" of the web means the reverse web side. It is thus clear that said terms have a relative meaning only, and a web which has been coated on one side in accordance with the method according to the invention, may very well be unwound again from the roll onto which it has firstly been wound, in order to be passed in reverse condition through another splicing and associated coating station or stations to receive a coating or coatings at its other side. Such a process is in practice performed in the manufacture of, for instance, common radiographic film which is provided with a radiation-sensitive and an antistress layer on both its sides.

The terms "leading" and "trailing" are used to designate physical position or location and are used in reference to the direction of travel of the webs.

The term "layer" stands for a single layer of a coating composition but it includes also a composite layer that is composed of several distinct layers that have different compositions and that maintain distinct relationship.

Since the "open" side of the butt-joint of the webs is facing the coater lip or nozzle, it will be understood that the width of the gap between the adjacent web end edges should be greatly restricted in order to limit the discontinuity at the splice joint. Modern accurately operating splicing tables can achieve gap widths ranging from 0.05 to 0.15 mm and it should be noted that if the full benefits of the method according to the present invention are desired, the gap width shall not excessively exceed the mentioned gap range.

The application of the hydrophobic coating to the butt-joint area at the front side of the webs may occur by a pad soaked with coating composition, e.g. by a felttipped marking pen, but by far a better method comprises the use of a spray gun, for instance of a type as used in lithography for carrying out local corrections on an image. Such spray gun may be used manually, but it is evident that automatic operation, in timed sequence after a splice has been made, and by motorized displacement along a guide that extends transversely of the path of the webs, is the indicated mode of operation in practice.

The hydrophobic coating may be applied over a bank-like region the longitudinal central axis of which coincides with the gap of the butt-joint, and the width of which may range from 5 to 20 mm.

The application of the splicing tape to the back side of the webs, instead of to the front side thereof, may occur in two ways in existing coating installations. Either the existing splicing table is replaced by a new one that applies the splicing tape to the back side of the webs rather than to the front side, or a web inverter arrangement is installed between the existing splicing station and the coating station, so that between the splicing station and the coating station the web is reversed about its longitudinal axis. As an example of a suitable web inverter we refer to the arrangement disclosed in British patent Specification No. 986,259.

The invention will be described hereinafter by way of example with reference to the accompanying drawings, wherein.

Figure 1:
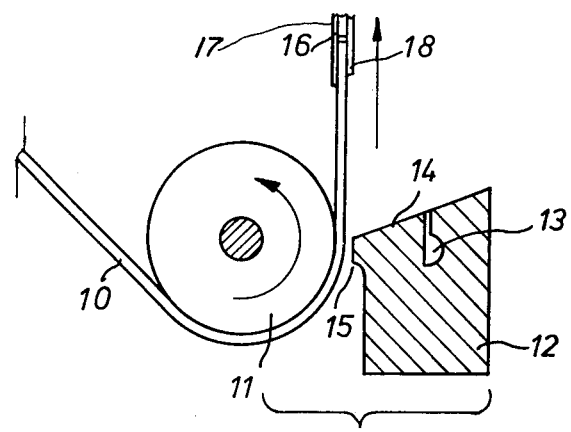
FIG. 1 is a schematic representation of a so-called bead coater and of a web that has a splicing zone that has passed already through the coater.

Referring to FIG. 1, a web 10 is drawn over a web-supporting roller 11 through a coating station that in the present example has been illustrated as a bead coater. Suchlike coater may comprise a coating head 12 with a manifold 13 through which the coating composition is pumped outwardly onto a slide surface 14 from which it flows downwardly as a layer of uniform thickness. Contact of the layer with the web occurs through a so-called bead of coating composition (not shown) which may be stabilised by maintaining at the lower side of the lip 15 of the coater an air pressure that is lower than the air pressure at the upper side of the lip, said upper pressure being usually the ambient air pressure. The spacing between the web and the front side of the lip 15 usually ranges between 0.2 and 0.5 mm.

The web 10 may be considered in the present embodiment as the new web, since it is butt-joined by a tape splice 16 to the web 17 which is the receding or old web that has already passed through the coating station. The layer applied to the web by means of the coater 12 has not been illustrated in FIG. 1. The tape 16 may have been applied to the webs by means of any known splicing apparatus known in the art, that preferably cuts the webs while they are overlying each other so that closely meeting web edges are produced. Removal of the cut web portion at the back side of the webs and the subsequent taping together of the adjacent web ends produce the desired butt-joint.

The treatment in accordance with the present invention to reduce coating defects at the passage of a web splice through the coating station comprises the application of a band 18 of a hydrophobic coating composition to the splicing region over the front side of the webs, prior to the passage of the web splice through the coating station.

Figure 2:
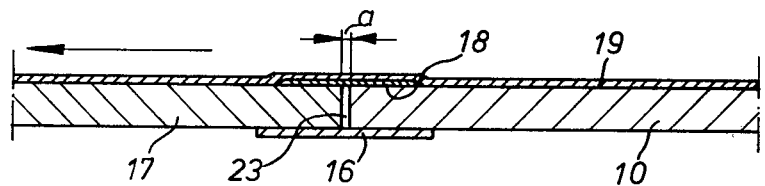
FIG. 2 is an enlarged schematic section through a spliced joint treated in accordance with the present invention.

The mentioned hydrophobic coating band 18 has been illustrated more in detail in FIG. 2, wherein also the layer 19 of aqueous solution applied by the coater 12 has been illustrated. It may be seen that the transverse cross-section of the hydrophobic coating 18 has been illustrated as truly rectilinear. It will be understood that this form is theoretical only, since actually the center portion of the band 18 will sag somewhat in the gap between the abutting web edges, the width of which has been indicated by the dimension a, whereas the longitudinal edges of said band will be more or less feathered, depending on their flowing out, the drying velocity of said hydrophobic coating and the method of application. In connection with the latter point, it will be readily understood that the application of said coating by means of a felt-tipped marking pen or by a felt strip covering the width of the webs, will result in a band that has a more truly rectilinear cross-section than has a band resulting from the spraying of the hydrophobic composition. It should also be noted that the drawing of FIG. 2 does not represent the different thicknesses on a true scale, since the thickness of the webs usually ranges between about 50 and 180$\mu$, the thickness of the tape 16 between 40 and 70$\mu$, the thickness of the hydrophobic layer 18 is usually smaller than 10$\mu$, and the thickness of the wet aqueous solution may vary between 15 and 150$\mu$ for a single layer. The above values are indicative only, and thus in no way shall be considered to be limitative for the scope of the present invention.

The gap between the two webs should ideally be zero, but imperfections of the cutting systems of splicing tables are the cause therefore that in practice the opening a has a value ranging between 0.05 and 0.2 mm. Smaller separations are permissible, but attention should be paid in case any partial overlapping of the web edges should happen, that such overlapping should in any case have the form of a step-up deformation at the front side of the webs, since it is generally known that a step-down deformation is the site for the formation and entrainment of air bubbles that disturb the coating process and are the cause of flaw formtions.

Figure 3:
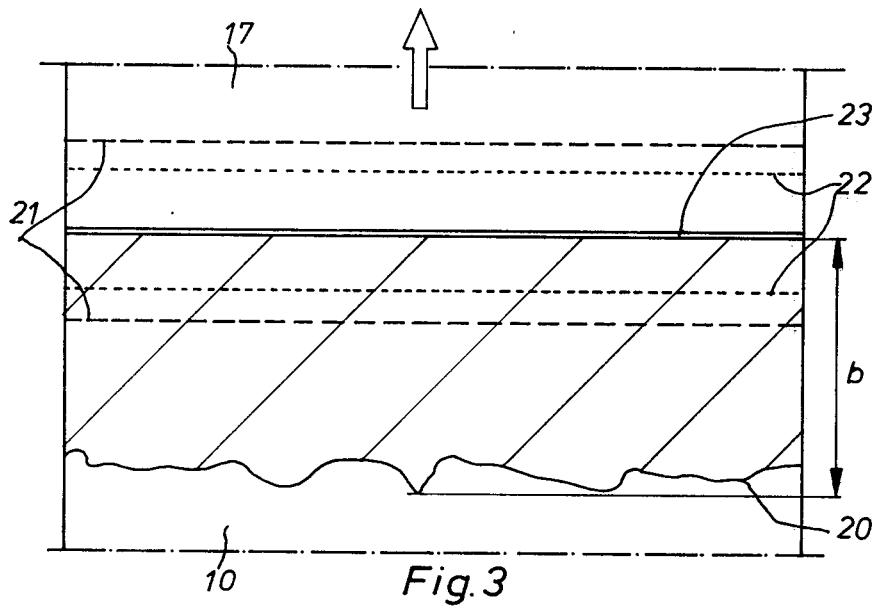
FIG. 3 is a schematic representation of the front side of the splicing area of coated webs, showing common coating flaws.

A representation of the coating flaws as they are formed in practice is given in FIG. 3 wherein the line 20, which has a very capricious course, indicates the end of coating flaws which originate at the gap 23 between the webs. Thus the area, downstream of the splice, which has been hatched, is an area where the uniformity of the coating thickness is destroyed and/or wherein longitudinal streaks and other defects may be present that lead to a loss of material over a length, indicated by b. The broken lines 21 in FIG. 3 indicate the splice tape 16 at the back side of the webs, whereas the broken lines 22 indicate the longitudinal boundaries of the hydrophobic coating on the front side of the webs.

It should be noted that in practice the effective width over which the aqueous solutin is coated on the webs is often smaller than the total width of the webs, since the edge knurled margins of the webs usually receive no coating. Yet it is preferred to apply the hydrophobic coating over the complete width of the webs in order to avoid transition phenomena near the lateral edges of the webs.

The following embodiment illustrates the practice of the method according to the present invention.

Two polyethylene terephthalate webs of a width of 1.7 m and a thickness of $180\mu$ that were provided over both their surface, with a subbing layer, were butt-joined by means of a polyester splicing tape having a width of 25 mm, a thickness of $60\mu$ (including the adhesive layer). The separation gap a between the web edges amounted to 0.05 mm. The separation web edges were passed through a coating station of the slide hopper-type as illustrated in FIG. 1, which was arranged for simultaneously coating a layer of an aqueous gelatine-silver halide dispersion and an aqueous gelatinous antistress layer on the front side of the webs. The distance between the lip of the coater and the web mounted to 0.3 mm.

A spray device, mounted on a carriage for transverse displacement across the web path, was provided for spraying a hydrophobic layer on the splice zone of the webs at a position that was 30 mm downstream of the position where the splice was made. The length of the web path between the spray installation for the hydrophobic coating and the slide hopper amounted to 70 meters.

The hydrophobic coating composition was as follows:
  35 g of Albertol KP 111, a trade name of Reichhold-Albert Chemie, Germany, for a phenol resin modified with collophonium,
  10 g of stearic acid,
  5 g of ISOPAR, a trade name for an aliphatic hydrocarbon having a boiling range of 160° to 175° C. and a KB value of 27, marketed by the Esso Standard Oil Cy,
  450 ml of a 50:50 mixture of xylene/butanol.

Before the container of the spray-gun was filled with this composition, the composition was diluted in a ratio of 1 volume part of composition per 4 volume parts of methylene chloride.

In a first experiment, the tape (the reverse surface of which was provided with a subbing layer) was applied to the front side of the webs, and the hydrophobic coating was sprayed in a band that had a width of about 1 cm and that covered the downstream portion of the splicing tape and the adjacent surface of the new web end, as known in the art. The wet thickness of the hydrophobic coating amounted to about $5\mu$ at the moment of application whereas the thickness at the moment the web splice reached the coating station 12 was estimated at 1 to $1.5\mu$. It was noticed that the maximum coating speed at which no coating flaws at all occurred, could amount to 60 m/min, whereas at a coating speed of 100 m/min, coating flaws in a web section with a length b equal to 50 cm, occurred.

In a second experiment, the tape was applied to the back side of the webs, and the hydrophobic layer was sprayed in a band of a wdith of 1 cm to the front side of the web splice, so that each half of the hydrophobic coating covered one web end. It was noticed that the maximum coating speed at which no coating flaws occurred at all, amounted to 100 m/min.

It will be understood that the present invention is not limited to the described embodiment.

The hydrophobic coating may be otherwise composed or applied than in the described example. For instance, some marking pigment may be added for facilitating the initial adjustment of the spraying device. The composition may also be applied by contact rather than by spraying. In one embodiment such application may occur by a felt covered roller that is rolled either by hand or automatically over the splice zone and that has a width corresponding with the desired width of the hydrophobic coating zone. In another embodiment, such application may be done by means of a felt covered bar or other pervious material that is soaked with the hydrophobic composition and that is urged widthwise against the webs after the splice has been made.

The application of the hydrophobic coating preferably occurs in the splicing table for butt-joining the webs to each other. One way for carrying out this application in known splicing tables that comprise a stationary clamping support and a movable clamping support for clamping in the operative position, both webs firmly onto each other during the cutting and the taping, as disclosed for instance in British Pat. No. 1,333,083 and British Application No. 47,696/75 relating to butt-splicers and assigned to the same assignee as the present application, is as follows.

Apart from the rollers that determine for the running web a path that is close to, but separated from the stationary clamping support, there are provided additional rollers that are bodily displaceable to temporarily come into contact with the front side of the running webs. Such bodily displacement occurs immediately after a new butt-splice has been made and after the movable support has been withdrawn from the stationary support into its inoperative position, to urge the path of the connected webs, while the webs are still at standstill, towards the movable support thereby to create a sufficient space between the webs and the stationary support. Guides tht extend transversely of the path of the webs may then be pivoted in the space between the front side of the webs and the stationary clamping support, and a carriage that is displaceable on said guides and that may be driven, e.g. by an air motor in a way similar to the driving of the cutting and taping carriages disclosed in the aforementioned patent specifications, is moved along the gap between the two abutting web ends. A spray gun that is mounted on the carriage sprays the hydrophobic coating on the butt-joint area at the front side of the webs.

The carriage is rapidly retracted at the end of its course into its initial rest position besides the web path, the guides for the carriage and the bodily displaceable rollers are swung into their inoperative position, and the web movement may be restarted. The mentioned operations related to the hydrophobic coating may be carried out within a period of 2 to 3 seconds only, so that in practice web accumulators that are mounted downstream of the splicing table to enable the web coating process to go on uninterruptedly while yet the webs are at standstill during the splicing operation, need in case they are operating at their very upper limit, be at most enlarged only slightly.

We claim:

1. Method for the continuous coating of a moving web with a layer of an aqueous solution of hydrophilic colloid, wherein disturbances in the layer of said aqueous solution downstream of a spliced joint in the web are reduced which comprises the steps of butt-joining the web ends to each other by means of a splicing tape over the back sides of the web edges proximate the splice and applying to the butt-joint area at the front sides of the webs a hydrophobic coating prior to applying the layer of aqueous colloid solution.

2. Method according to claim 1, wherein said hydrophobic coating is applied immediately after the splicing of the webs.

3. Method according to claim 1, wherein said hydrophobic coating is applied symmetrically across the butt-joint of the webs.

4. Method according to claim 1, wherein said hydrophobic coating is applied by a pad soaked with composition.

5. Method according to claim 1, wherein said hydrophobic coating is applied by spray-coating.

6. The method of claim 1 wherein the separation between the adjacent end edges of the webs at said spliced joint is generally within the range of about 0.05–0.15 mm.

* * * * *